US009841505B2

(12) United States Patent
Kim et al.

(10) Patent No.: US 9,841,505 B2
(45) Date of Patent: Dec. 12, 2017

(54) ELECTRONIC DEVICE AND METHOD FOR CONTROLLING SAME

(71) Applicant: LG ELECTRONICS INC., Seoul (KR)

(72) Inventors: Sungmin Kim, Seoul (KR); Sehwan Park, Seoul (KR); Kyungchan Park, Seoul (KR); Hyunjoon Lee, Seoul (KR); Youngman Kwon, Seoul (KR); Jayong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/038,399

(22) PCT Filed: Dec. 10, 2013

(86) PCT No.: PCT/KR2013/011378
§ 371 (c)(1),
(2) Date: May 20, 2016

(87) PCT Pub. No.: WO2015/088056
PCT Pub. Date: Jun. 18, 2015

(65) Prior Publication Data
US 2016/0291157 A1    Oct. 6, 2016

(51) Int. Cl.
*G01C 3/08*  (2006.01)
*G01S 17/36*  (2006.01)
(Continued)

(52) U.S. Cl.
CPC ............ *G01S 17/36* (2013.01); *G01B 11/026* (2013.01); *G01S 7/4911* (2013.01)

(58) Field of Classification Search
CPC .......... G01B 11/026; G01C 3/02; G01C 3/32; G01C 3/08; G01C 3/22
(Continued)

(56) References Cited

U.S. PATENT DOCUMENTS

2002/0154907 A1* 10/2002 Ojima .................. H04N 5/2354
396/61
2008/0007446 A1* 1/2008 Nakamura .............. G01S 7/487
342/27
(Continued)

FOREIGN PATENT DOCUMENTS

EP    1365256 A1   11/2003
EP    1617233 A2    1/2006
(Continued)

*Primary Examiner* — Tarifur Chowdhury
*Assistant Examiner* — Md M Rahman
(74) *Attorney, Agent, or Firm* — Birch, Stewart, Kolasch & Birch, LLP

(57) ABSTRACT

An electronic device including a signal unit configured to emit a first radiated signal to a subject; a signal receiving unit configured to detect a reflected signal of the first radiated signal from the subject; and a controller configured to determine whether a distance to the subject is calculated based on the reflected signal of the first radiated signal, change a waveform of the first radiated signal when the distance is not calculated, cause the signal output unit to emit a second radiated signal with the changed waveform, detect, via the signal receiving unit, a reflected signal of the second radiated signal from the subject, and calculate the distance to the subject based on the reflected signal of the second radiated signal.

11 Claims, 13 Drawing Sheets

(51) Int. Cl.
*G01B 11/02* (2006.01)
*G01S 7/491* (2006.01)

(58) Field of Classification Search
USPC .............................................. 356/3
See application file for complete search history.

(56) References Cited

U.S. PATENT DOCUMENTS

| | | | | |
|---|---|---|---|---|
| 2011/0012774 A1* | 1/2011 | Sakai | .................... | G01S 7/4021 342/145 |
| 2011/0025480 A1* | 2/2011 | Hwang | ............... | H04M 19/047 340/407.1 |
| 2011/0096033 A1* | 4/2011 | Ko | .......................... | G06F 3/017 345/175 |
| 2013/0134984 A1* | 5/2013 | Terada | ............... | G01R 31/2621 324/509 |
| 2014/0334685 A1* | 11/2014 | Chen | ..................... | G06T 7/2033 382/107 |

FOREIGN PATENT DOCUMENTS

| | | |
|---|---|---|
| JP | 2000-46934 A | 2/2000 |
| JP | 2010-203789 A | 9/2010 |
| KR | 10-2003-0078961 A | 10/2003 |
| KR | 10-2006-0005971 A | 1/2006 |
| KR | 10-2012-0019666 A | 3/2012 |

* cited by examiner

[Figure 1]
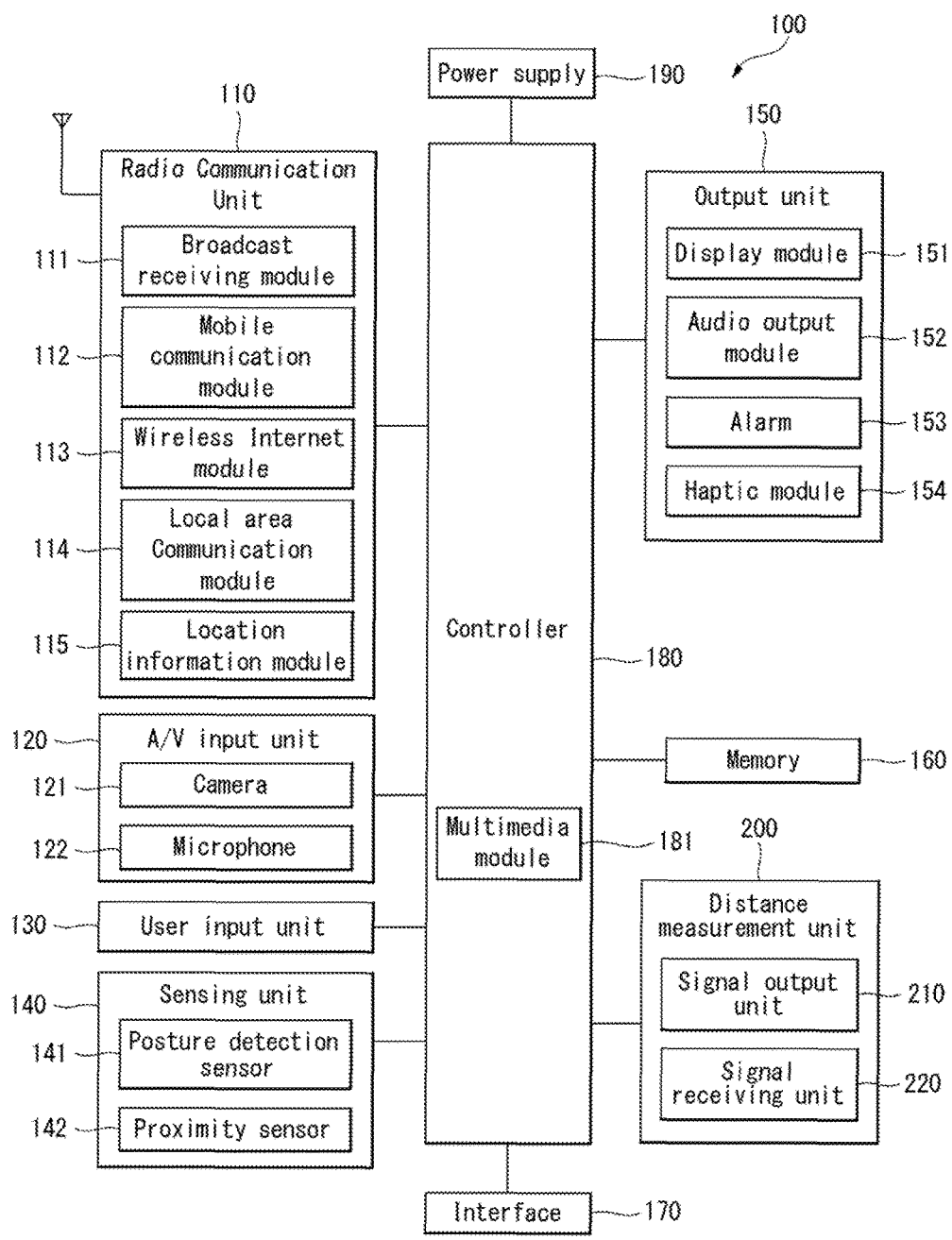

[Figure 2]
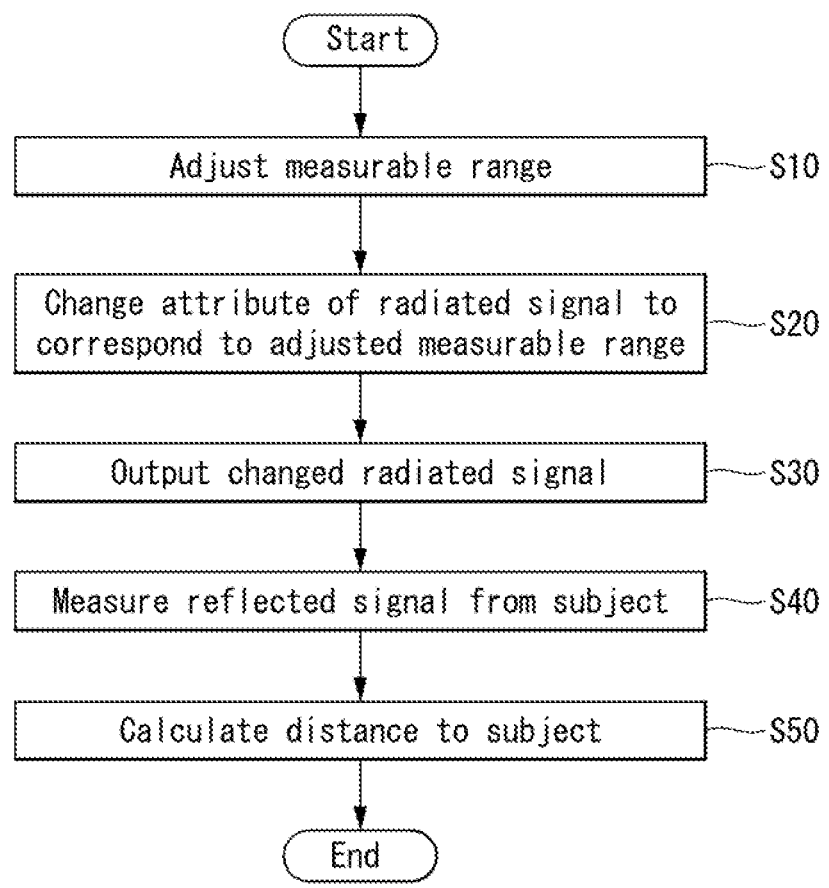

[Figure 3]
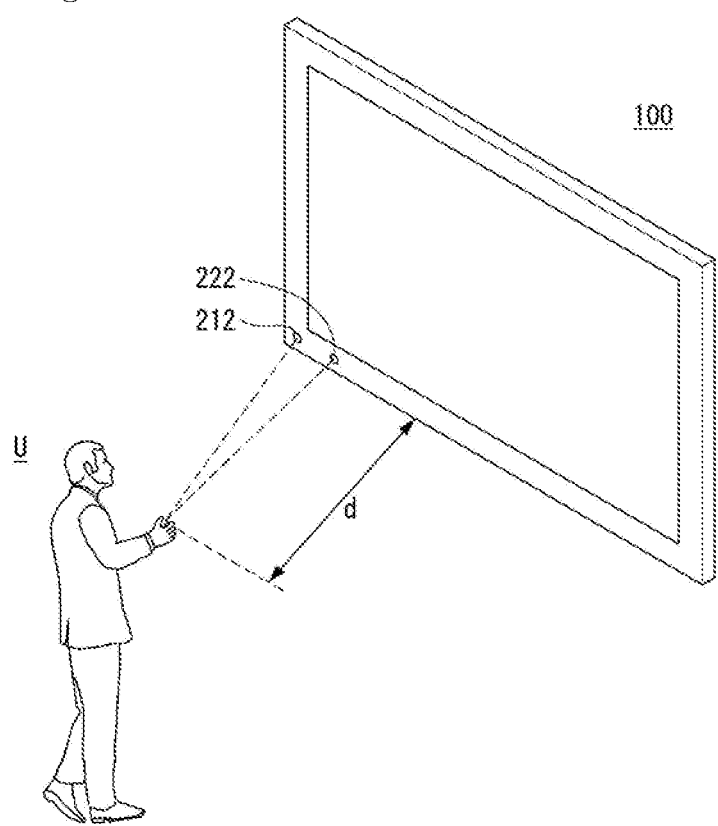

[Figure 4]
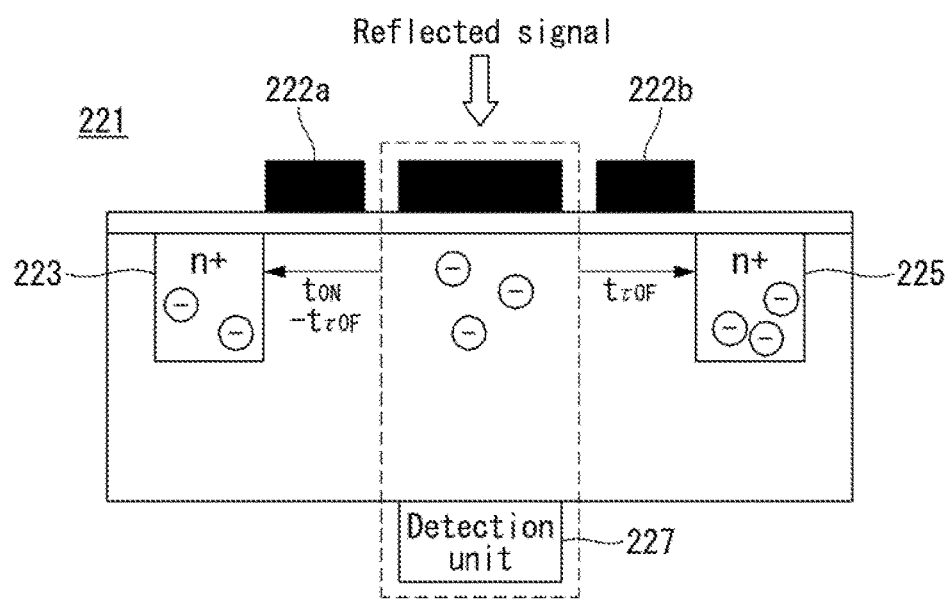

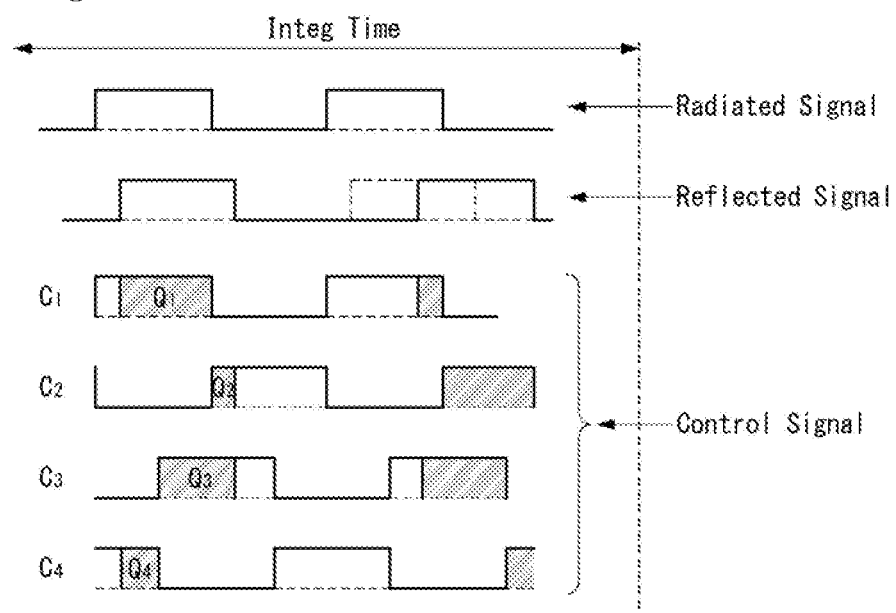

[Figure 6]
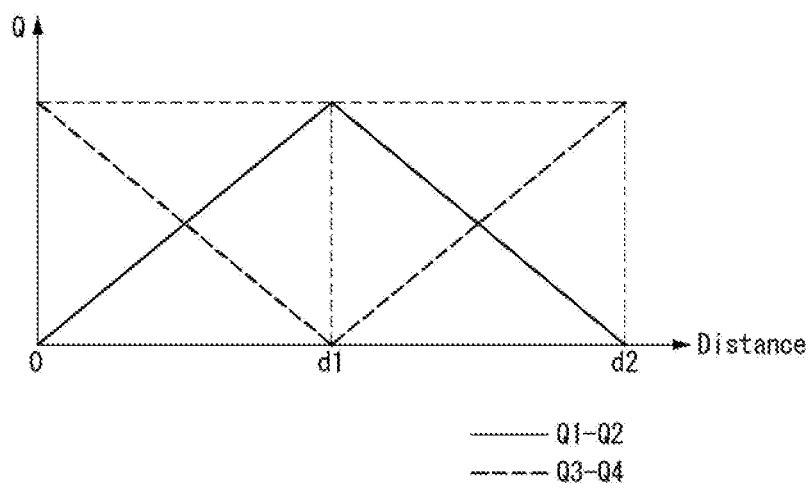

[Figure 7]
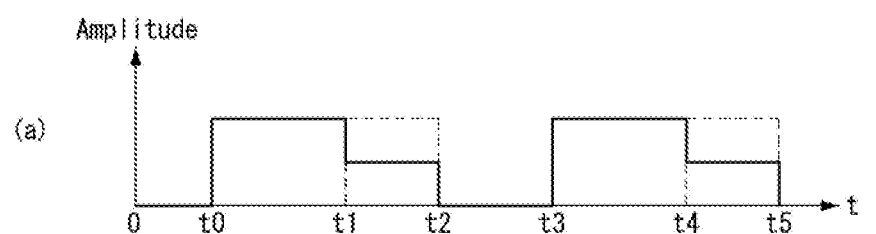
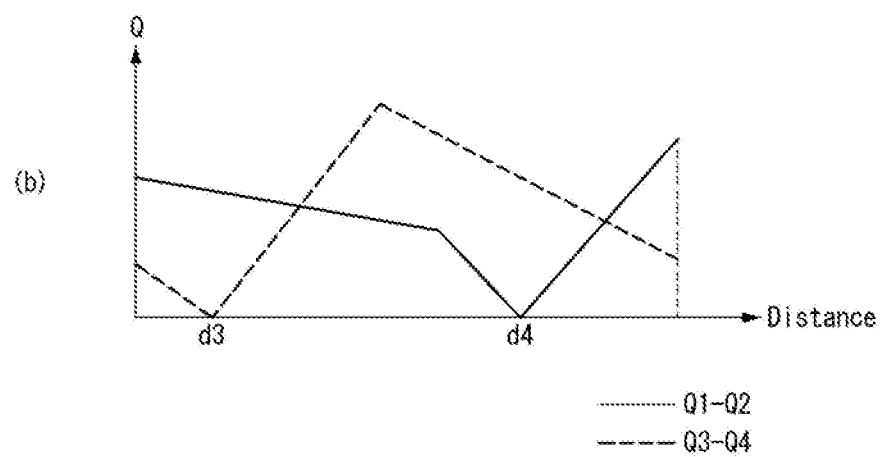

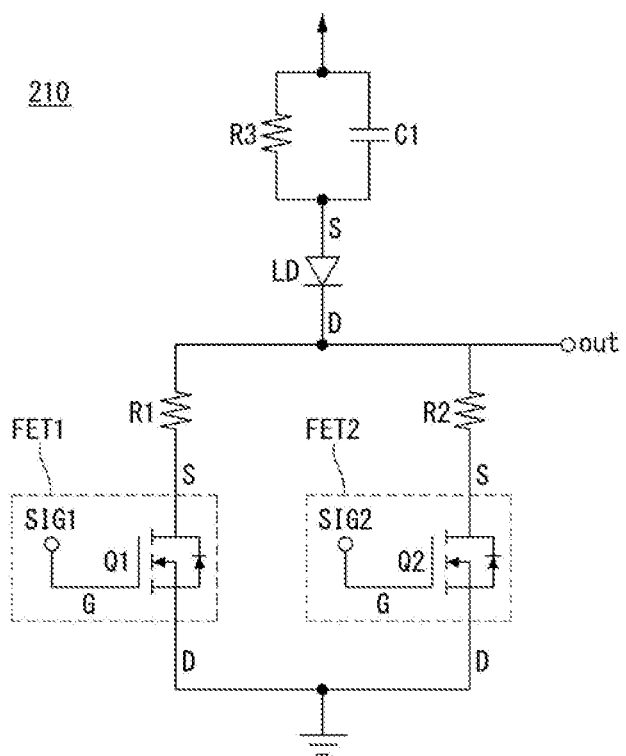
[Figure 8]

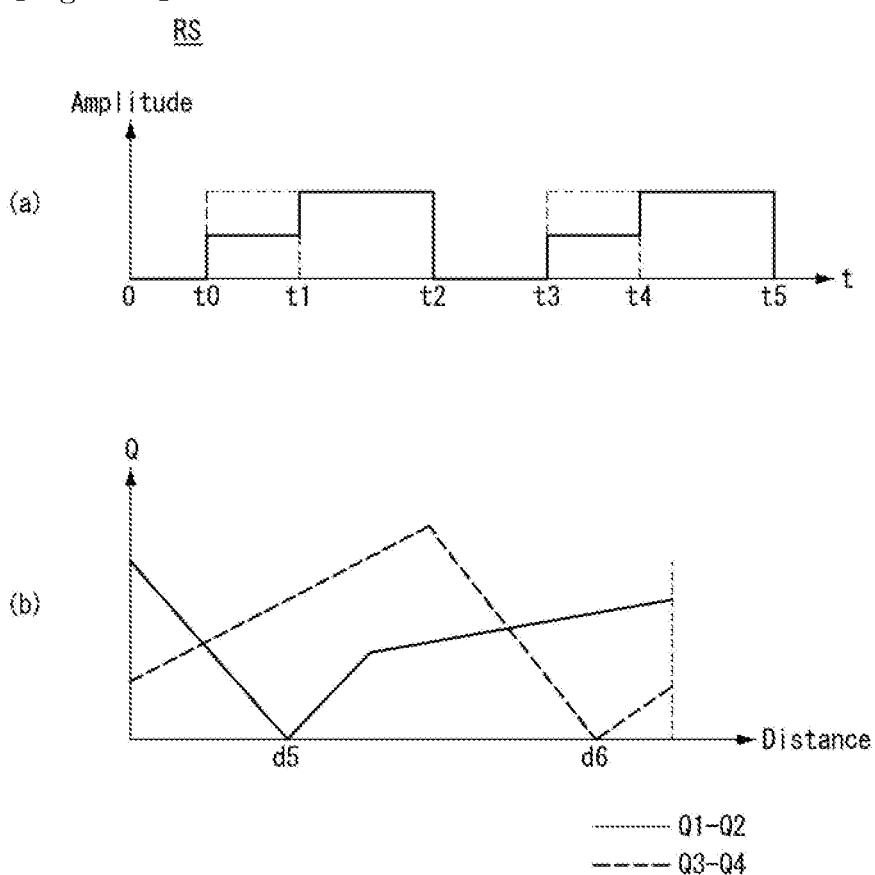
[Figure 9]

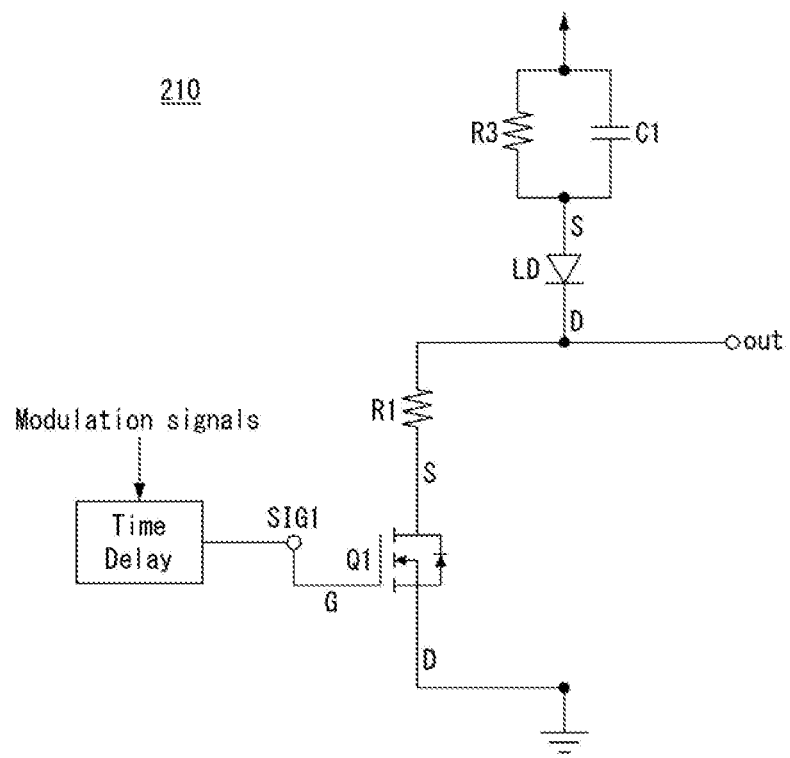
[Figure 10]

[Figure 11]
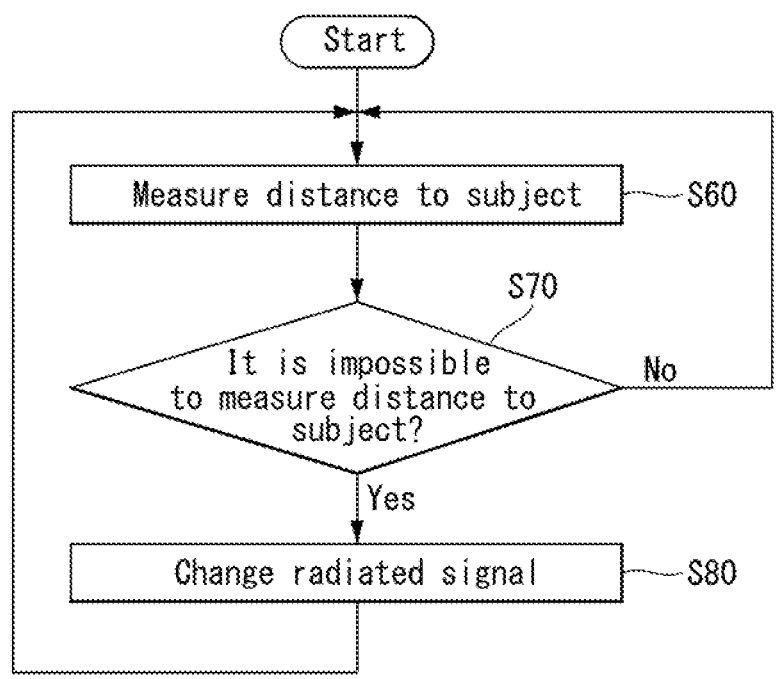

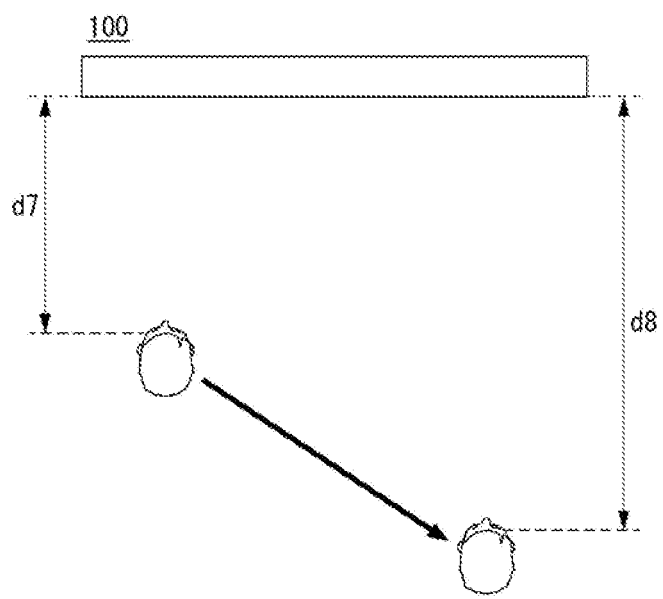
[Figure 12]

[Figure 13]
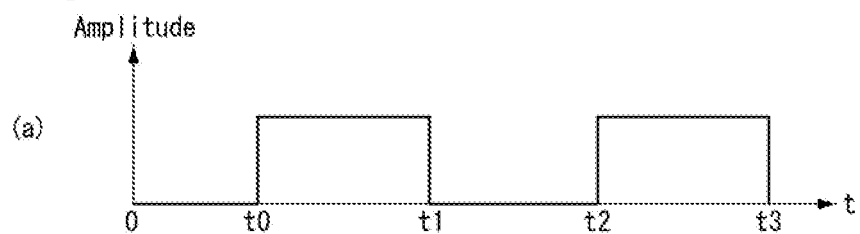
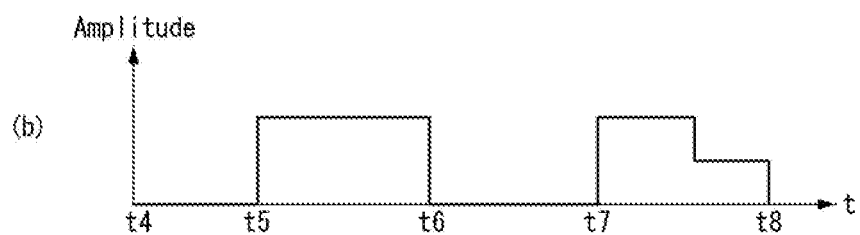
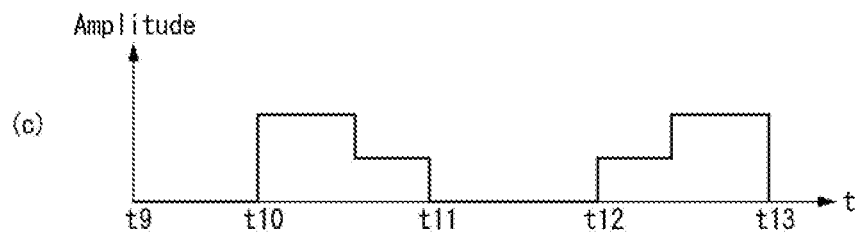

ELECTRONIC DEVICE AND METHOD FOR CONTROLLING SAME

TECHNICAL FIELD

The present invention relates to an electronic device, and more particularly, to an electronic device and a method of controlling the same that can change a waveform of a radiated signal in order to change a distance range to a measurable subject.

BACKGROUND ART

With diversification of a function of an electronic device such as a personal computer, a notebook computer, and a mobile phone, the electronic device has been implemented into a multimedia player having a complex function such as photographing of a picture or a moving picture, reproduction of a music file or a moving picture file, game playing, and reception of broadcasting.

The electronic device may be classified into a mobile terminal and a stationary terminal according to whether the electronic device can be moved. In other words, the mobile terminal may be classified into a handheld terminal and a vehicle mount terminal according to whether a user can directly carry the mobile terminal.

In order to support and enhance a function of the electronic device, it is considered to improve a structural portion and/or a software portion of the electronic device.

SUMMARY OF THE INVENTION

The present invention provides an electronic device and a method of controlling the same that can change a waveform of a radiated signal in order to change a distance range to a measurable subject.

In accordance with an aspect of the present invention, an electronic device includes: an output unit configured to emit a radiated signal to at least one subject; a receiving unit configured to detect a reflected signal of the radiated signal by the at least one subject; and a controller configured to calculate a distance to the at least one subject based on the reflected signal and to change a waveform of the radiated signal of the output unit in order to change a measurable range of the distance.

The controller may generate at least one control signal having different phases and calculate a distance to the at least one subject based on the reflected signal and the at least one control signal.

The controller may sequentially change an amplitude of the radiated signal.

The controller may adjust the waveform in a form of at least one of a first radiated signal whose amplitude reduces based on a specific time point in the radiated signal and a second radiated signal whose amplitude increases based on a specific time point in the radiated signal.

In the output unit, Field Effect Transistor (FET) circuits may be disposed in parallel between an output terminal and the ground.

The output unit may include at least one delay circuit.

The radiated signal may include a first waveform of first radiated signal and a second waveform of second radiated signal, and the controller may calculate a distance to the subject using the second radiated signal, when the controller fails to calculate a distance to the subject using the first radiated signal.

The controller may control to emit any one of the first and second radiated signals through the output unit to correspond to a movement of the subject.

In accordance with another aspect of the present invention, an electronic device includes: an output unit configured to emit a radiated signal to at least one subject; a receiving unit configured to detect a reflected signal of the radiated signal by the at least one subject; and a controller configured to calculate a distance to the at least one subject based on the reflected signal and to change a waveform of the radiated signal of the output unit in order to increase accuracy of the calculated distance.

The controller may sequentially change an amplitude of the radiated signal.

In accordance with another aspect of the present invention, a method of controlling an electronic device includes: changing and generating a waveform of a radiated signal in order to change a range of a measurable distance to at least one subject; emitting the generated radiated signal to the at least one subject; detecting a reflected signal of the radiated signal by the at least one subject; and calculating a distance to the at least one subject based on the reflected signal.

The method may further include generating at least one control signal having different phases, wherein the calculating of a distance may include calculating a distance to the at least one subject based on the reflected signal and the at least one control signal.

The changing and generating of a waveform of a radiated signal may include sequentially changing an amplitude of the radiated signal.

The changing and generating of a waveform of a radiated signal may include adjusting the waveform in a form of at least one of a first radiated signal whose amplitude reduces based on a specific time point in the radiated signal and a second radiated signal whose amplitude increases based on a specific time point in the radiated signal.

The radiated signal may include a first waveform of first radiated signal and a second waveform of second radiated signal, and the changing and generating of a waveform of a radiated signal may include calculating a distance to the subject using the second radiated signal, when it fails to calculate a distance to the subject using the first radiated signal.

An electronic device and a method of controlling the same according to the present invention can change a waveform of a radiated signal in order to change a distance range to a measurable subject.

BRIEF DESCRIPTION OF THE DRAWINGS

FIG. 1 is a block diagram illustrating a configuration of an electronic device according to an exemplary embodiment of the present invention.

FIG. 2 is a flowchart illustrating operation of the electronic device of FIG. 1.

FIGS. 3 to 6 are diagrams illustrating a distance measurement process of the electronic device of FIG. 1.

FIGS. 7 to 10 are diagrams illustrating an output waveform of the electronic device of FIG. 1.

FIGS. 11 to 13 are diagrams illustrating operation of the electronic device according to another exemplary embodiment.

DETAILED DESCRIPTION OF THE EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

FIG. 1 is a block diagram of a mobile terminal 100 according to an embodiment of the present invention. Other embodiments, configurations and arrangements may also be provided. As shown, the mobile terminal 100 may include a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 may be essential parts and the number of components included in the mobile terminal 100 may be varied. The components of the mobile terminal 100 will now be described.

The radio communication unit 110 may include at least one module that enables radio communication between the mobile terminal 100 and a radio communication system or between the mobile terminal 100 and a network in which the mobile terminal 100 is located. For example, the radio communication unit 110 may include a broadcasting receiving module 111, a mobile communication module 112, a wireless Internet module 113, a local area communication module 114, and a location (or position) information module 115.

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The local area communication module 114 may correspond to a module for local area communication. Further, Bluetooth®, radio frequency identification (RFID), infrared data association (IrDA), ultra wideband (UWB) and/or Zig-Bee® may be used as a local area communication technique.

The location information module 115 may confirm or obtain the position of the mobile terminal 100. The position information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan among others.

A global positioning system (GPS) module is a representative example of the location information module 115. The GPS module 115 may calculate information on distances between one point or object and at least three satellites and information on a time when the distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. In addition, the GPS module 115 may continuously calculate the current position in real time and calculate velocity information using the location or position information.

As shown in FIG. 1, the A/V input unit 120 may input an audio signal or a video signal and include a camera 121 and a microphone 122. The camera 121 may process image frames of still images or moving images obtained by an image sensor in a video telephony mode or a photographing mode. The processed image frames may be displayed on a display module 151 which may be a touch screen.

The image frames processed by the camera 121 may be stored in the memory 160 or may be transmitted to an external device through the radio communication unit 110. The mobile terminal 100 may also include at least two cameras 121.

The microphone 122 may receive an external audio signal in a call mode, a recording mode or a speech recognition mode and process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and generate a sensing signal for controlling operation of the mobile terminal 100. For example, in case of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a posture detection sensor 141.

The output unit 150 may generate visual, auditory and/or tactile output and may include the display module 151, an audio output module 152, an alarm 153 and a haptic module 154. The display module 151 may display information processed by the mobile terminal 100. The display module 151 may display a user interface (UI) or a graphic user interface (GUI) related to a telephone call when the mobile terminal 100 is in the call mode. The display module 151 may also display a captured and/or received image, a UI or a GUI when the mobile terminal 100 is in the video telephony mode or the photographing mode.

In addition, the display module 151 may include at least one of a liquid crystal display, a thin film transistor liquid crystal display, an organic light-emitting diode display, a flexible display and a three-dimensional display. Some of these displays may be of a transparent type or a light transmissive type. That is, the display module 151 may include a transparent display.

The transparent display may include a transparent liquid crystal display. The rear structure of the display module 151 may also be of a light transmissive type. Accordingly, a user may see an object located behind the body of the mobile terminal 100 through the transparent area of the body of the mobile terminal 100 that is occupied by the display module 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

Further, when the display module 151 and a sensor sensing touch (hereafter referred to as a touch sensor) form a layered structure that is referred to as a touch screen, the display module 151 may be used as an input device in addition to an output device. The touch sensor may be in the form of a touch film, a touch sheet, and a touch pad, for example.

The touch sensor may convert a variation in pressure applied to a specific portion of the display module 151 or a variation in capacitance generated at a specific portion of the display module 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display module 151.

The proximity sensor 141 of the sensing unit 140 may be located in an internal region of the mobile terminal 100, surrounded by the touch screen, or near the touch screen. The proximity sensor 141 may sense an object approaching a predetermined sensing face or an object located near the proximity sensor using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of convenience of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the radio communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and the like. The audio output module 152 may output sounds through an earphone jack. The user may hear the sounds by connecting an earphone to the earphone jack.

The alarm 153 may output a signal for indicating generation of an event of the mobile terminal 100. For example, alarms may be generated when receiving a call signal, receiving a message, inputting a key signal, or inputting touch. The alarm 153 may also output signals in forms different from video signals or audio signals, for example, a signal for indicating generation of an event through vibration. The video signals or the audio signals may also be output through the display module 151 or the audio output module 152.

The haptic module 154 may generate various haptic effects that the user can feel. One example of the haptic effects is vibration. The intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk or an optical disk. The mobile terminal 100 may also operate in relation to a web storage performing the storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and a universal subscriber identify module (USIM). An identification device including the user identification module may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 as shown in FIG. 1 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments of the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented by the controller 180.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

FIG. 2 is a flowchart illustrating operation of the electronic device of FIG. 1.

As shown in FIG. 2, the controller 180 of the electronic device 100 according to an exemplary embodiment of the present invention may perform step (S10) of adjusting a measurable range and step (S20) of changing an attribute of a radiated signal to correspond to the adjusted measurable range.

The electronic device 100 may measure a distance between a subject in the vicinity thereof and the electronic device 100. When the electronic device 100 measures a distance to the subject, in a distance range, an optimal distance range in which the electronic device 100 can measure or a distance range in which the electronic device 100 cannot easily measure may exist. For example, an optimal distance range in which the electronic device 100 can measure may be changed according to a waveform of a radiated signal emitted from a signal output unit 210 of the electronic device 100. That is, it is difficult to measure a distance with a specific waveform of radiated signal, but it may be easy to measure a distance with another waveform of radiated signal.

The measurable range may be set when producing the electronic device 100. When setting a measurable range upon producing the electronic device 100, the measurable range may be adjusted in consideration of an estimated use aspect of the electronic device 100. For example, when the electronic device 100 is a television, it is assumed that a subject is located in front of the television under a common television use environment, and a measurable range may be set. Further, when the electronic device 100 is a mobile phone, if a user takes a user picture, the user may set a measurable range in consideration of an arm length thereof.

The measurable range may be adjusted by the controller 180. That is, the measurable range may be changed to correspond to a present situation. For example, a first radiated signal corresponding to a first measurable range is emitted, but when measurement is not smoothly performed, a second radiated signal having an attribute different from that of the first radiated signal may be emitted. The attribute may be, for example, a waveform of a radiated signal.

When an attribute of the radiated signal is changed, a measurable range may be changed. For example, when using a first radiated signal, it is difficult to measure a distance to a subject existing at a distance of 1 m from the electronic device 100, but when using a second radiated signal, it is possible to measure a distance to a subject existing at a distance of 1m from the electronic device 100. As described above, an attribute of a radiated signal related to a measurable range may be set when producing the electronic device 100 or may be changed by the user and/or the controller 180.

The controller 180 may perform step (S30) of outputting the changed radiated signal.

The controller 180 may radiate a changed radiated signal through the signal output unit 210. The radiated signal may be infrared rays. When the radiated signal is infrared rays, the signal output unit 210 may be a light source that outputs an infrared ray signal.

The controller 180 may perform step (S40) of measuring a reflected signal from the subject.

The radiated signal may be emitted toward the front side of the signal output unit 210. The emitted radiated signal may be reflected by the subject existing at a location separated from the electronic device 100. Hereinafter, a signal reflected from the subject may be referred to as a reflected signal.

A signal receiving unit 220 may detect a reflected signal. A portion of signals reflected and scattered by the subject may be detected by the signal receiving unit 220. When the radiated signal is infrared rays, the signal receiving unit 220 may be an optical sensor that can detect infrared rays.

The controller 180 may perform step (S50) of calculating a distance to the subject.

The controller 180 may calculate a distance to the subject based on a detected reflected signal. For example, the controller 180 may calculate a distance to the subject based on a phase difference between a radiated signal and a reflected signal. A method of calculating a distance to the subject will be described in detail in a corresponding portion.

FIGS. 3 to 6 are diagrams illustrating a distance measurement process of the electronic device of FIG. 1.

As shown in FIGS. 3 to 6, the electronic device 100 according to an exemplary embodiment of the present invention may measure a distance to a subject through a radiated signal.

As shown in FIG. 3, at the front side of the electronic device 100, a user U, which is a subject, may be located. For menu selection and/or game manipulation of an application executed in the electronic device 100, an input from the user U may be required. Alternatively, it may be necessary to acquire an image including distance information of each portion of a subject.

When it is necessary to measure a distance, the controller 180 may measure a distance to a subject d through a distance measuring unit 200. For example, the controller 180 may radiate infrared rays through a light emitting diode 212 that can radiate a predetermined attribute of infrared ray signal and detect a reflection signal of infrared rays radiated through an optical sensor 222.

As shown in FIG. 4, the reflected signal may be detected through a pixel 221 constituting the optical sensor 222. The optical sensor 222 may include a plurality of pixels 221. The pixel 221 may include a detection unit 227, gates 222a and 222b, and integrated portions 223 and 225.

The detection unit 227 may perform a function of receiving a reflected signal and generating electrons.

The gates 222a and 222b may transfer electrons generated in the detection unit 227 to the integrated portions 223 and 225. For example, the gates 222a and 222b may selectively transfer the generated electrons to the first and second integrated portions 223 and 225 according to a control signal.

The integrated portions 223 and 225 may integrate the transferred electrons. An integrated time or cycle of electrons may be preset. For example, the integrated portions 223 and 225 may integrate electrons for a predetermined time and emit the integrated electrons. That is, the integrated portions 223 and 225 may repeat integration and emission of electrons. The number of the integrated portions 223 and 225 and/or the gates 222a and 222b may be changed.

As shown in FIG. 5, a reflected signal may have a waveform different from that of a radiated signal. For example, due to a reciprocating time between the electronic device 100 and a subject and/or reflection in a subject, a phase of the reflected signal may be delayed, compared with a phase of the radiated signal.

The controller 180 may apply a plurality of control signals C1 to C4. The controller 180 may calculate a value of an electric charge amount of Q1 to Q4 based on a phase difference between the reflected signal and a plurality of control signals C1 to C4. For example, the controller 180 may calculate Q1, which is a value of an electric charge amount that has occurred while both the reflected signal and a first control signal C1 have a high value, Q2, which is a value of an electric charge amount that has occurred while both the reflected signal and a second control signal C2 have a high value, Q3, which is a value of an electric charge amount that has occurred while both the reflected signal and a third control signal C3 have a high value, and Q4, which is a value of an electric charge amount that has occurred while both the reflected signal and a fourth control signal C4 have a high value.

When calculating Q1 to Q4, a distance d between the electronic device 100 and the subject may be calculated by a predetermined equation.

As shown in FIG. 6, a difference between values Q1 and Q2 and a difference between values Q3 and Q4 may be in a predetermined correlation. For example, a total electric charge amount may be constant and a difference between a value Q1-Q2 and a value Q3-Q4 may be inversely proportional. The difference between a value Q1-Q2 and a value Q3-Q4 may change according to a distance to the subject. For example, the value Q1-Q2 may converge on 0 at a point in which a distance to the subject is 0 and a point in which a distance to the subject is d2. However, the value Q3-Q4 may converge on 0 at a point in which a distance to the subject is d1. When the value Q1-Q2 and/or the value Q3-Q4 converge on 0, the distance d may be inaccurately calculated. That is, as shown in FIG. 5, in an equation, when a denominator or a numerator becomes 0, the calculated distance d may not be reliable. Such a phenomenon may be related to a waveform of a radiated signal. For example, when the radiated signal is a rectangle sine wave or a square wave shown in FIG. 5, if a subject exists at a distance of 3 meter from the electronic device 100, a phenomenon may occur that the value Q1-Q2 converges on 0. By changing a waveform of the radiated signal, a measurable range of the electronic device 100 according to an exemplary embodiment of the present invention can be effectively changed.

FIGS. 7 to 10 are diagrams illustrating an output waveform of the electronic device of FIG. 1.

As shown in FIGS. 7 to 10, the electronic device 100 according to an exemplary embodiment of the present invention may adjust a measurable range with a method of changing a waveform of a radiated signal.

As shown in FIG. 7A, a waveform of a radiated signal RS1 may be changed. For example, an amplitude from t0 to t1 and an amplitude from t1 to t2 may be differently set. An amplitude from t1 to t2 may be a half of an amplitude from t0 to t1.

By combining a plurality of signals in which a magnitude and/or a direction of an amplitude are different, the signal output unit 210 may change the radiated signal RS1.

As shown in FIG. 7B, when a waveform of the radiated signal RS is changed, a value of Q1-Q2 and/or Q3-Q4 may be changed. That is, each value may converge on 0 at points d3 and d4. The points d3 and/or d4 may have a value different from that of d1 and/or d2. For example, d3 may be about 70 cm, and d4 may be about 3.7 m. Unlike a case of a square wave, at a point other than the point d3 and/or d4, a distance may be accurately measured.

A change of a measurable distance may be a major element according to a use aspect of the electronic device 100. For example, when the electronic device 100 is a television, a distance between the user who views the television and the television may be generally estimated. Statistical data exist in which the television is generally located at a living room and in which the user views the television at a distance of about 3 m. In such a case, it may be necessary to effectively measure a distance of about 3 m. Therefore, a product may be set to enhance measurement accuracy at about 3 m when producing a product and/or when installing the electronic device 100.

As shown in FIG. 8, the signal output unit 210 may include a plurality of FET circuits FET1 and FET2. For example, the signal output unit 210 may modulate a radiated signal whose amplitude changes using first and second FET circuits FET1 and FET2. The FET circuit may be a Field Effect Transistor circuit that amplifies a voltage or that operates a switch. The plurality of FET circuits may be located between an output terminal and the ground. The plurality of FET circuits may be disposed in parallel between the output terminal and the ground.

As shown in FIG. 9A, a radiated signal RS may have a small amplitude in a range from T0 to t1 and may have a large amplitude in a range from t1 to t2.

As shown in FIG. 9B, when using a radiated signal RS having a large amplitude in a range from t1 to t2, the value Q1-Q2 may converge on 0 at d5 and the value Q3-Q4 may converge on 0 at d6. For example, d5 may be about 2.1 m and d6 may be about 5.1 m.

As shown in FIG. 10, a delay circuit may be added to the signal output unit 210. Due to addition of the delay circuit, the radiated signal may be time shifted for a predetermined time. When the radiated signal is time shifted, a distance to a measurable subject may be changed.

FIGS. 11 to 13 are diagrams illustrating operation of an electronic device according to another exemplary embodiment of the present invention.

As shown in FIGS. 11 to 13, the electronic device 100 according to another exemplary embodiment of the present invention may change a radiated signal and measure a distance to a subject.

As shown in FIG. 11, the controller 180 of the electronic device 100 may perform step (S60) of measuring a distance to the subject.

A distance to the subject may be measured using a radiated signal set to the electronic device 100. For example, the controller 180 may measure a distance to the subject using a radiated signal set as a basic value when producing the electronic device 100 or a radiated signal changed by the user and/or a control signal of the controller 180.

The controller 180 may perform step (S70) of determining whether it is impossible to measure a distance to the subject.

When a distance to the subject exists within a specific range, the distance may not be normally measured. For example, when a radiated signal is a rectangle sine wave or a square wave, if the subject exists at a location d1 and/or d2, it may fail to measure the distance.

If it is impossible to measure a distance to the subject, the controller 180 may perform step (S80) of changing a radiated signal.

A measurable range may be changed according to a kind of a radiated signal. Therefore, when it fails to measure a distance, the controller 180 may adjust a waveform of a radiated signal. For example, a rectangle sine wave or a square wave may be changed to another form of waveform.

As shown in FIG. 12, the user may move from a distance d7 to a distance d8 from the electronic device 100. When the user locates at the distance d7, a distance to the user, which is a subject may be normally measured. However, when the user moves to the distance d8, it may be impossible to measure a distance with a present radiated signal. When a distance to the subject is changed, the controller 180 of the electronic device 100 according to an exemplary embodiment of the present invention may change a radiated signal to correspond thereto.

As shown in FIG. 13(a), the controller 18U may measure a distance to the subject to a time point t3 using a radiated signal of a rectangle sine wave form.

As shown in FIG. 13(b), the controller 180 may fail to measure a distance to the subject in a range between time points t5 and t6. For example, a location to the subject may be changed.

When it fails to measure a distance to the subject, the controller 180 may change a radiated signal. For example, the radiated signal may be changed to a radiated signal having the same form as that between a time point t7 and a time point t8.

As shown in FIG. 13(c), it may fail to measure a distance to the subject in a range between a time point t10 and a time point t11. For example, the subject may be located at a location that cannot be measured by a radiated signal between a time point t7 and a time point t8 or the subject may be measured in a range from a time point t7 to a time point t8, but may not be measured in a range between a time point t10 and a time point t11 due to a movement of the subject. In such a case, the controller 180 may measure a distance using another form of radiated signal in a range between a time point t12 and a time point t13. That is, in order to measure a distance to a subject, the electronic device 100 according to an exemplary embodiment of the present invention may use various forms of radiated signals.

It will be apparent to a person of ordinary skill in the art that the invention is not limited to the disclosed embodiments, but, on the contrary, is intended to cover various modifications and equivalent arrangements included within the spirit and scope of the appended claims. Accordingly, all such changes, modifications and alterations should therefore be seen as within the scope of the present invention.

The invention claimed is:

1. An electronic device, comprising:
a light source configured to emit a first radiated signal, wherein the first radiated signal is an infrared ray signal;
an optical sensor configured to detect a reflected signal of the first radiated signal from the subject; and
a controller configured to:
cause the light source to emit the first radiated signal to a subject,
determine whether a distance to the subject is calculated based on the reflected signal of the first radiated signal,
when the distance is not calculated, change the first radiated signal to a second radiated signal by combining a plurality of signals in which a magnitude and a direction of an amplitude are different, wherein the second radiated signal is different from the first radiated signal,
cause the light source to emit the second radiated signal,
detect, via the optical sensor, a reflected signal of the second radiated signal from the subject, and
calculate the distance to the subject based on the reflected signal of the second radiated signal.

2. The electronic device of claim 1, wherein the controller generates at least one control signal having different phases and calculates the distance to the subject based on the reflected signal and the at least one control signal.

3. The electronic device of claim 1, wherein the controller sequentially changes an amplitude of the first radiated signal.

4. The electronic device of claim 3, wherein the controller adjusts the waveform in a form of at least one of the first radiated signal whose amplitude reduces based on a specific time point in the first radiated signal and the second radiated signal whose amplitude increases based on a specific time point in the second radiated signal.

5. The electronic device of claim 1, wherein in the light source, Field Effect Transistor (FET) circuits are disposed in parallel between an output terminal and the ground.

6. The electronic device of claim 1, wherein the light source comprises at least one delay circuit.

7. The electronic device of claim 1, wherein the controller controls to emit any one of the first and second radiated signals through the light source to correspond to a movement of the subject.

8. A method of controlling an electronic device, the method comprising:
emitting, via a light source, a first radiated signal to a subject, wherein the first radiated signal is an infrared ray signal;
detecting, via an optical sensor, a reflected signal of the first radiated signal from the subject;
determining, via a controller, whether a distance to the subject is calculated based on the reflected signal of the first radiated signal;
when the distance is not calculated, changing, via the controller, the first radiated signal to a second radiated signal by combining plurality of signals in which a magnitude and a direction of an amplitude are different, wherein the second radiated signal is different from the first radiated signal;
emitting, via the light source, the second radiated signal;
detecting, via the optical sensor, a reflected signal of the second radiated signal from the subject; and
calculating, via the controller, the distance to the subject based on the reflected signal of the second radiated signal.

9. The method of claim 8, further comprising generating at least one control signal having different phases,
wherein the calculating of the distance comprises calculating the distance to the subject based on the reflected signal and the at least one control signal.

10. The method of claim 8, wherein the changing of the waveform comprises sequentially changing an amplitude of the first radiated signal.

11. The method of claim 10, wherein the changing of the waveform comprises adjusting the waveform in a form of at least one of the first radiated signal whose amplitude reduces based on a specific time point in the first radiated signal and the second radiated signal whose amplitude increases based on a specific time point in the second radiated signal.

* * * * *